(12) United States Patent
Okamoto et al.

(10) Patent No.: US 11,534,964 B2
(45) Date of Patent: Dec. 27, 2022

(54) METHOD FOR PRODUCING THREE-DIMENSIONAL SHAPED ARTICLE

(71) Applicant: Seiko Epson Corporation, Tokyo (JP)

(72) Inventors: Eiji Okamoto, Matsumoto (JP); Akihiko Tsunoya, Okaya (JP)

(73) Assignee: SEIKO EPSON CORPORATION

( * ) Notice: Subject to any disclaimer, the term of this patent is extended or adjusted under 35 U.S.C. 154(b) by 579 days.

(21) Appl. No.: 16/204,112

(22) Filed: Nov. 29, 2018

(65) Prior Publication Data
US 2019/0160738 A1 May 30, 2019

(30) Foreign Application Priority Data

Nov. 30, 2017 (JP) .............................. JP2017-230698

(51) Int. Cl.
*B29C 64/165* (2017.01)
*B29C 64/153* (2017.01)
(Continued)

(52) U.S. Cl.
CPC .......... *B29C 64/165* (2017.08); *B22F 3/1007* (2013.01); *B22F 10/10* (2021.01); *B29C 64/153* (2017.08); *B29C 64/194* (2017.08); *B29C 64/209* (2017.08); *B33Y 10/00* (2014.12); *B33Y 30/00* (2014.12); *B22F 3/10* (2013.01);
(Continued)

(58) Field of Classification Search
CPC .................. B23K 15/086; B28B 1/001; B22F 2003/1057; B22F 3/1007; B22F 10/10; B22F 2998/10; B22F 3/1021; B22F 2999/00; B22F 2201/01; B22F 3/10; B29C 64/153; B29C 64/165; B29C 64/194; B29C 64/336; B33Y 10/00; B33Y 30/00; B33Y 70/00
See application file for complete search history.

(56) References Cited

U.S. PATENT DOCUMENTS 5,738,817 A * 4/1998 Danforth ........... C04B 35/63488
419/36
2018/0154437 A1* 6/2018 Mark .................... B22F 1/0059

FOREIGN PATENT DOCUMENTS

| CN | 106270512 A | 1/2017 |
|----|-------------|--------|
| JP | 08-057967 A | 3/1996 |

OTHER PUBLICATIONS

ASM Handbook, vol. 7, Powder Metallurgy P. Samal and J. Newkirk, editors DOI: 10.31399/asm.hb.v07.a0006135 (Year: 2015).*

* cited by examiner

*Primary Examiner* — Nicholas A Wang
(74) *Attorney, Agent, or Firm* — Harness, Dickey & Pierce, P.L.C.

(57) ABSTRACT

Provided is a method which includes a first layer formation step of forming a first layer by using a first composition that contains a constituent material powder, a first powder, and a binder of a three-dimensional shaped article; a second layer formation step of forming a second layer by using a second composition that contains a second powder and a binder; a degreasing step of a stack containing the first layer and the second layer; and a sintering step of the stack, a decomposition point of the first powder is higher than decomposition points of the binder of the first layer and the binder of the second layer, a decomposition point of the second powder is higher than the decomposition point of the first powder, and a sintering temperature of the constituent material powder is higher than the decomposition point of the second powder.

6 Claims, 11 Drawing Sheets

(51) Int. Cl.
*B29C 64/209* (2017.01)
*B33Y 10/00* (2015.01)
*B33Y 30/00* (2015.01)
*B22F 3/10* (2006.01)
*B29C 64/194* (2017.01)
*B22F 10/10* (2021.01)
*B33Y 70/00* (2020.01)
*B29C 64/336* (2017.01)

(52) U.S. Cl.
CPC ....... *B22F 2998/10* (2013.01); *B22F 2999/00* (2013.01); *B29C 64/336* (2017.08); *B33Y 70/00* (2014.12)

METHOD FOR PRODUCING THREE-DIMENSIONAL SHAPED ARTICLE

This application claims priority under 35 U.S.C. § 119 to Japanese Patent Application No. 2017-230698 filed on Nov. 30, 2017, the entire disclosure of which is expressly incorporated by reference herein.

BACKGROUND

Technical Field

The present invention relates to a method for producing a three-dimensional shaped article.

Related Art

In the related art, various production methods for a three-dimensional shaped article have been used. Among them, there is a method for producing a three-dimensional shaped article while supporting a constituent layer of the three-dimensional shaped article with a support layer.

For example, JP-A-8-57967 discloses a method for producing a three-dimensional shaped article while forming a plurality of layers from a shaping material (constituent layer of a three-dimensional shaped article) for a three-dimensional shaped article and a support material (support layer) therefor.

In the method for producing a three-dimensional shaped article while supporting a constituent layer of the three-dimensional shaped article with a support layer, a stack formed of the constituent layer and the support layer may be heated. However, as the stack is heated, an impurity derived from the support layer may be incorporated into the constituent layer depending on constitutions of the constituent layer and the support layer. In particular, in a case where a three-dimensional shaped article is configured to have a low density, an impurity derived from the support layer may be incorporated into a pore part formed in the constituent layer.

SUMMARY

An advantage of some aspects of the invention is that in a case of producing a three-dimensional shaped article while supporting a constituent layer of the three-dimensional shaped article with a support layer, an impurity derived from the support layer is prevented from being incorporated into the constituent layer of the three-dimensional shaped article.

According to an aspect of the invention, there is provided a method for producing a three-dimensional shaped article in which the three-dimensional shaped article is produced by stacking layers, the method including: forming a first layer out of the layers by using a first composition that contains a constituent material powder, a first powder, and a binder which constitute the three-dimensional shaped article; forming a second layer out of the layers by using a second composition that contains a second powder and a binder so that the second layer is in contact with the first layer; removing at least a part of the first powder, the binder of the first layer, and the binder of the second layer by heating a stack containing the first layer and the second layer; and sintering the constituent material powder by heating the stack containing the first layer and the second layer, in which the first powder and the second powder are the same material or both are resin materials, a decomposition point of the first powder is higher than decomposition points of the binder of the first layer and the binder of the second layer, a decomposition point of the second powder is equal to or higher than the decomposition point of the first powder, and a sintering temperature of the constituent material powder is higher than the decomposition point of the second powder.

In this configuration, the first powder and the second powder are the same material or both are resin materials, the decomposition point of the first powder is higher than the decomposition points of the binder of the first layer and the binder of the second layer, the decomposition point of the second powder is higher than the decomposition point of the first powder, and the sintering temperature of the constituent material powder is higher than the decomposition point of the second powder. That is, due to the sintering of the constituent material powder, it becomes possible to decompose and remove the second powder which can become an impurity derived from the support layer together with the first powder. As a result, an impurity derived from the support layer can be prevented from being incorporated into the three-dimensional shaped article.

According to another aspect of the invention, there is provided a method for producing a three-dimensional shaped article in which the three-dimensional shaped article is produced by stacking layers, the method including: forming a first layer out of the layers by using a first composition that contains a constituent material powder, a first powder, and a binder which constitute the three-dimensional shaped article; forming a second layer out of the layers by using a second composition that contains a second powder and a binder so that the second layer is in contact with the first layer; removing at least a part of the first powder, the binder of the first layer, and the binder of the second layer by heating a stack containing the first layer and the second layer; and sintering the constituent material powder by heating the stack containing the first layer and the second layer, in which the first powder is a resin material and the second powder is a carbon particle, a decomposition point of the first powder is higher than decomposition points of the binder of the first layer and the binder of the second layer, and a sintering temperature of the constituent material powder is higher than the decomposition point of the second powder.

In this configuration, the first powder is a resin material and the second powder is a carbon particle, the decomposition point of the first powder is higher than the decomposition points of the binder of the first layer and the binder of the second layer, and the sintering temperature of the constituent material powder is higher than the decomposition point of the second powder. In this case, the carbon particle can be removed as the constituent material powder is sintered by being oxidized under an oxidizing atmosphere in which a gas containing oxygen such as the atmosphere is introduced, by being heated under a reducing atmosphere in which hydrogen gas or the like is introduced, or the like. As a result, an impurity derived from the support layer can be prevented from being incorporated into the three-dimensional shaped article.

In the method for producing a three-dimensional shaped article, the stack containing the first layer and the second layer may have a region where the first layer overlaps with the second layer.

In this configuration, the stack containing the first layer and the second layer has a region where the first layer overlaps with the second layer. That is, the stack has a region where the first layer is supported, from a lower side, by the second layer. In such a region, the second powder easily enters a pore derived from the first powder. However, by removing the second powder, it is possible to prevent an impurity derived from the support layer from being incorporated into the three-dimensional shaped article.

In the method for producing a three-dimensional shaped article, the constituent material powder may be a metal or non-oxide ceramics, and the sintering may be performed under a reducing atmosphere.

In this configuration, the constituent material powder is a metal or non-oxide ceramics, and the sintering is performed under a reducing atmosphere. Therefore, it is possible to prevent an impurity derived from the support layer from being incorporated into the three-dimensional shaped article without oxidizing the constituent material powder which is a metal or non-oxide ceramics.

In the method for producing a three-dimensional shaped article, the constituent material powder may be oxide ceramics, and the sintering may be performed under an oxidizing atmosphere.

In this configuration, the constituent material powder is oxide ceramics, and the sintering is performed under an oxidizing atmosphere in which a gas containing oxygen such as the atmosphere is introduced. Therefore, it is possible to prevent an impurity derived from the support layer from being incorporated into the three-dimensional shaped article without reducing the constituent material powder which is oxide ceramics.

In the method for producing a three-dimensional shaped article, the first composition and the second composition may be pastes containing a solvent; in the forming of the first layer, the first layer may be formed by ejecting the first composition; and in the forming of the second layer, the second composition may be formed by ejecting the second composition.

In this configuration, the first composition and the second composition are pastes containing a solvent; in the forming of the first layer, the first layer is formed by ejecting the first composition; and in the forming of the second layer, the second layer is formed by ejection the second composition. Therefore, it is possible to produce a three-dimensional shaped article in which a paste is used to prevent an impurity derived from the support layer from being incorporated.

In the method for producing a three-dimensional shaped article, the first composition and the second composition may be solids at room temperature; in the forming of the first layer, the first layer may be formed by heating the first composition to a fluid state and performing injection; and in the forming of the second layer, the second layer may be formed by heating the second composition to a fluid state and performing injection.

In this configuration, the first composition and the second composition are solids at room temperature; in the forming of the first layer, the first layer is formed by heating the first composition to a fluid state and performing injection; and in the forming of the second layer, the second layer is formed by heating the second composition to a fluid state and performing injection. Therefore, it is possible to produce a three-dimensional shaped article in which a material (compound) which is a solid at room temperature is used to prevent an impurity derived from the support layer from being incorporated.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention will be described below with reference to the drawings.

FIGS. 1 to 4 are schematic configuration diagrams showing a configuration of a production apparatus for a three-dimensional shaped article according to an embodiment of the invention.

Figure 1:
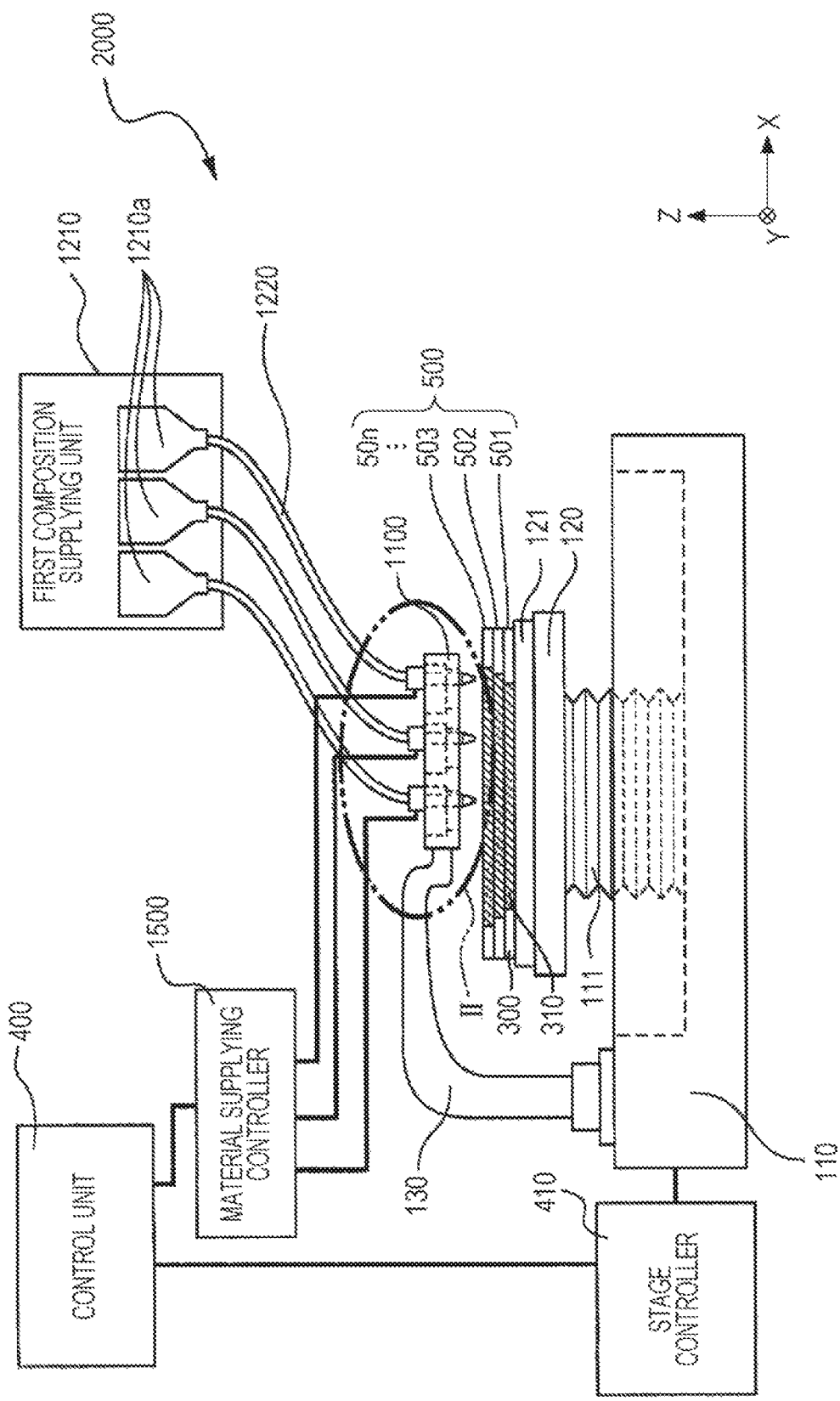
FIG. 1 is a schematic configuration diagram showing a configuration of a production apparatus for a three-dimensional shaped article according to an embodiment of the invention.
Figure 2:
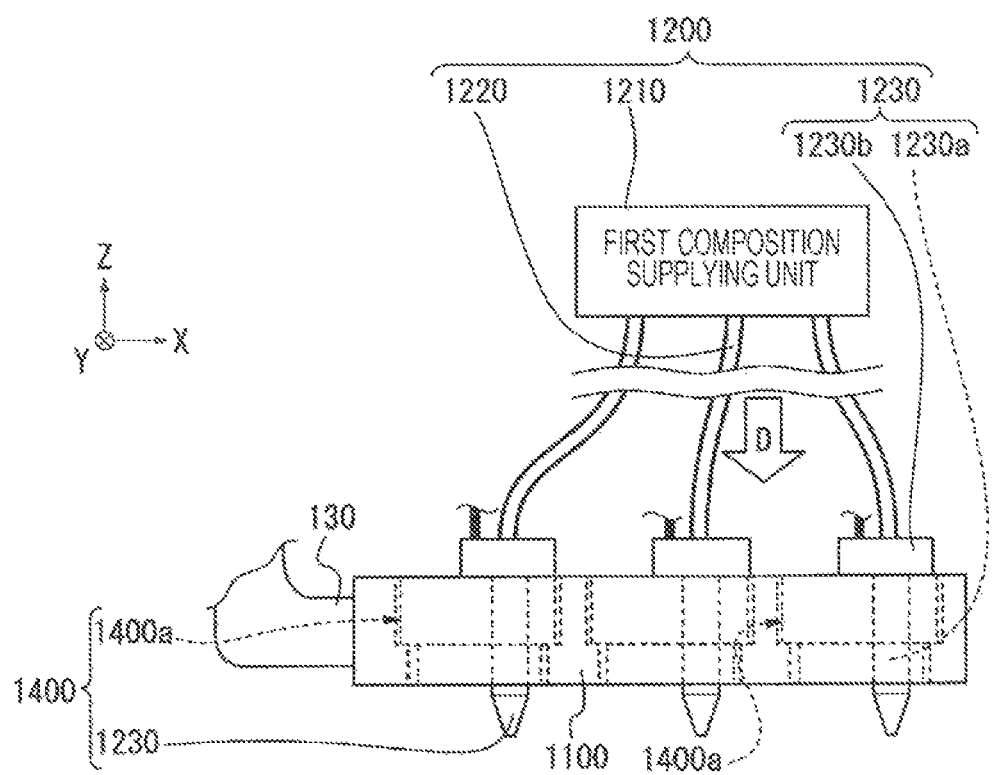
FIG. 2 is an enlarged view of a portion II shown in FIG. 1.
Figure 3:
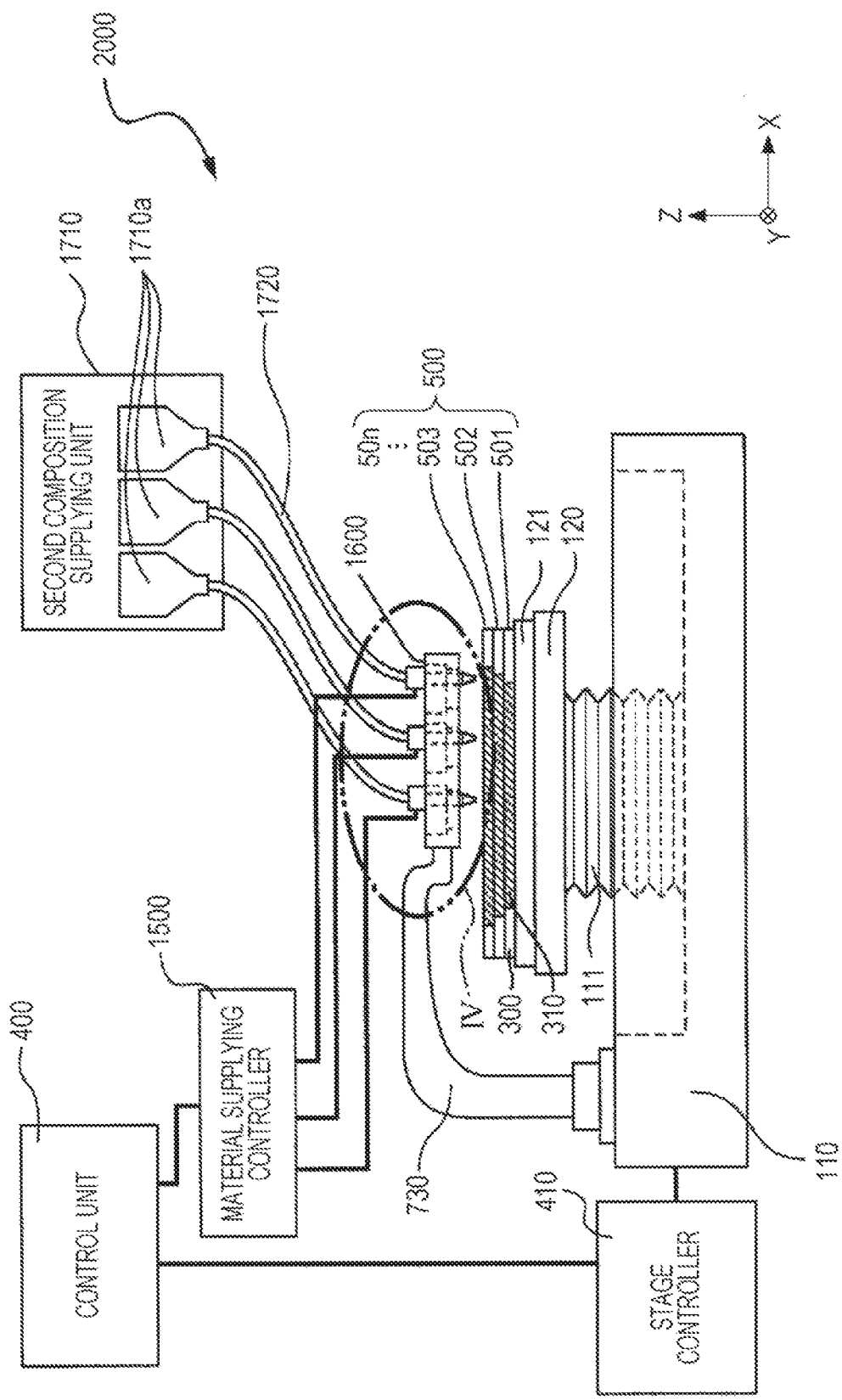
FIG. 3 is a schematic configuration diagram showing a configuration of a production apparatus for a three-dimensional shaped article according to an embodiment of the invention.
Figure 4:
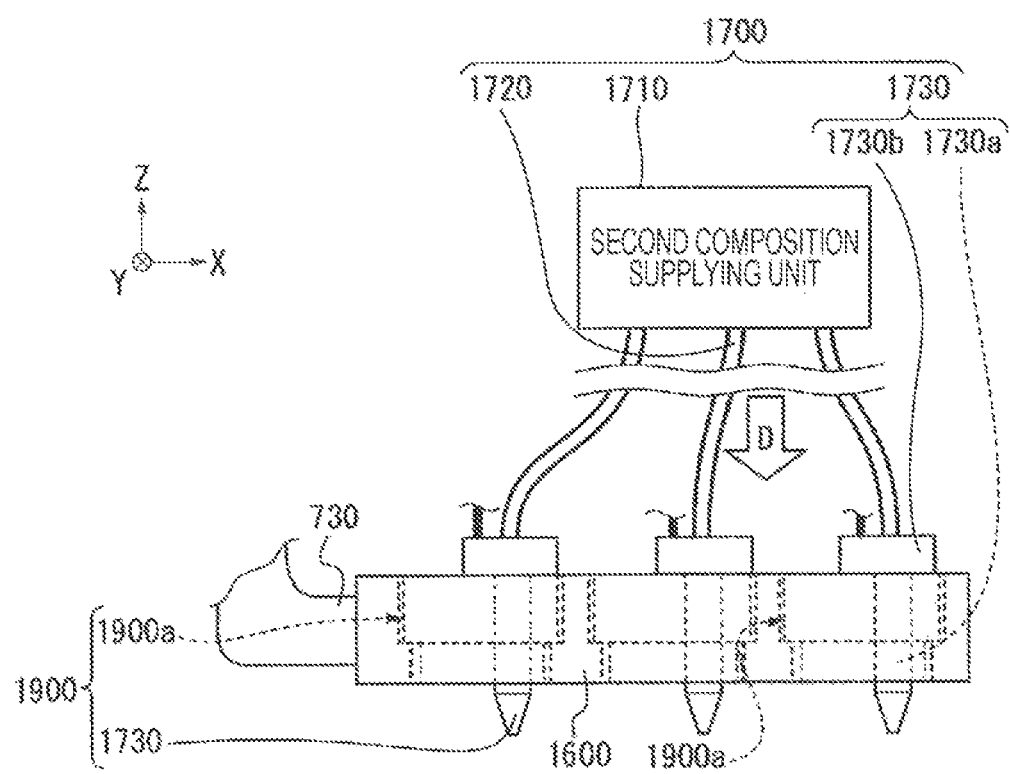
FIG. 4 is an enlarged view of a portion IV shown in FIG. 3.

In these cases, the production apparatus for a three-dimensional shaped article of the present embodiment is provided with two types of material supplying sections (head bases). Among them, FIGS. 1 and 2 are diagrams showing only one material supplying section (material supplying section for supplying the first composition that contains a constituent material powder, a first powder, and a binder which constitute a three-dimensional shaped article). FIGS. 3 and 4 are diagrams showing only another material supplying section (material supplying section for supplying the second composition which contains a second powder and a binder, and forms the support layer that supports a three-dimensional shaped article at the time of forming the three-dimensional shaped article).

In the specification, "three-dimensional shaping" means forming a so-called stereoscopically shaped article, and is, for example, intended to include also forming a flat plate shape, the so-called two-dimensional shape, into a shape in which a thickness is made therefor. Further, "support" is intended to include not only providing support from a lower side, but also providing support from a lateral side and in some cases providing support from an upper side.

In addition, the first composition of this example is a paste (flowable material) that contains a constituent material powder, a first powder, a solvent, and a binder soluble in the solvent which constitute a three-dimensional shaped article. The second composition (material for forming the support layer) of this example is a paste (flowable material) that contains a second powder which is a particle for forming the support layer, a solvent, and a binder soluble in the solvent. However, the invention is not limited to such a first composition and a second composition, and as the first composition and the second composition, compounds which are solids having a filament-like shape, a pellet-like shape, or the like, and become a fluid state in a case of being heated, or the like may be used.

A three-dimensional shaped article production apparatus 2000 (hereinafter referred to as a formation apparatus 2000) shown in FIGS. 1 and 3 is provided with a base 110 and a stage 120 that is configured such that a drive device 111 as drive means provided in the base 110 allows the stage 120 to move in the X, Y, or Z direction, or to be driven along a rotational direction about the Z axis.

As shown in FIGS. 1 and 2, there is provided a head base support 130 having one end portion fixed to the base 110 and the other end portion in which a head base 1100 is held and fixed, the head base 1100 holding a plurality of head units 1400, each head unit 1400 being provided with a first composition discharging section 1230 for discharging the first composition.

In addition, as shown in FIGS. 3 and 4, there is provided a head base support 730 having one end portion fixed to the base 110 and the other end portion in which a head base 1600 is held and fixed, the head base 1600 holding a plurality of head units 1900, each head unit 1900 being provided with a second composition discharging section 1730 for discharging the second composition.

In these cases, the head base 1100 and the head base 1600 are provided in parallel in the XY plane.

It is noted that the first composition discharging section 1230 and the second composition discharging section 1730 have the same configuration. However, the invention is not limited to such a configuration.

On the stage 120, layers 501, 502 and 503 are formed in the process of forming a three-dimensional shaped article 500 (a stack of a three-dimensional shaped article). A thermal energy may be irradiated by an electromagnetic wave irradiating section or the like for forming the three-dimensional shaped article 500. In such a configuration, in order to provide protection against the heat of the stage 120, a sample plate 121 having heat resistance may be used and the three-dimensional shaped article 500 may be formed on the sample plate 121. The sample plate 121 of the present embodiment is the one made of metal that is robust and easy to produce. However, by using, for example, a ceramic plate as the sample plate 121, it is possible to obtain high heat resistance. Also, the ceramic plate can also exhibit low reactivity with the constituent material powder of the three-dimensional shaped article 500 to be degreased, sintered, or the like, thereby preventing the three-dimensional shaped article 500 from being deteriorated. FIGS. 1 and 3, three layers of layers 501, 502, and 503 are illustrated for convenience of description. However, stacking is performed until a desired shape of the three-dimensional shaped article 500 is obtained (until layer 50n is stacked in FIGS. 1 and 3).

In this case, each of the layers 501, 502, 503, . . . , 50n includes at least one of the first layer 310 formed of the first composition which is discharged from the first composition discharging section 1230, and the second layer 300 formed of the second composition which is discharged from the second composition discharging section 1730.

It is noted that the formation apparatus 2000 of the present embodiment is a production apparatus for a three-dimensional shaped article which is capable of forming the layers 501, 502, 503, . . . , 50n, and a plurality of layers by using the first composition that contains a constituent material powder for the three-dimensional shaped article 500, and a support layer forming material (second composition). However, depending on a shape of the three-dimensional shaped article 500 to be produced, or the like, it is also possible to form a plurality of layers without using the support layer forming material.

Further, FIG. 2 is a conceptual diagram enlarging the portion II showing the head base 1100 shown in FIG. 1. As shown in FIG. 2, the head base 1100 holds a plurality of head units 1400. Although will be described in detail later, one head unit 1400 is configured such that the first composition discharging section 1230 provided in the first composition supplying device 1200 is held by a holding tool 1400a. The first composition discharging section 1230 includes a discharging nozzle 1230a, and a discharging drive section 1230b for discharging the first composition from the discharging nozzle 1230a by a material supplying controller 1500.

FIG. 4 is a conceptual diagram enlarging the portion IV showing the head base 1600 shown in FIG. 3. As shown in FIG. 4, the head base 1600 holds a plurality of head units 1900. The head unit 1900 is configured such that the second composition discharging section 1730 provided in a second composition supplying device 1700 is held by a holding tool 1900a. The second composition discharging section 1730 includes a discharging nozzle 1730a, and a discharging drive section 1730b for discharging the second composition from the discharging nozzle 1730a by the material supplying controller 1500.

As shown in FIGS. 1 and 2, the first composition discharging section 1230 is connected by a supplying tube 1220 to the first composition supplying unit 1210 that contains a first composition corresponding to each of the head units 1400 held in the head base 1100. A predetermined amount of the first composition is supplied from the first composition supplying unit 1210 to the first composition discharging section 1230. In the first composition supplying unit 1210, a first composition that contains a constituent material powder for the three-dimensional shaped article 500 shaped by the formation apparatus 2000 according to the present embodiment is contained in a first composition container 1210a, and the individual first composition containers 1210a are connected by the supplying tubes 1220 to the individual first composition discharging sections 1230. As such, by providing the individual first composition containers 1210a, a plurality of different types of first compositions can be supplied from the head base 1100.

As shown in FIGS. 3 and 4, the second composition discharging section 1730 is connected by a supplying tube 1720 to a second composition supplying unit 1710 that contains a second composition corresponding to each of the head units 1900 held in the head base 1600. A predetermined amount of the second composition is supplied from the second composition supplying unit 1710 to the second composition discharging section 1730. In the second composition supplying unit 1710, a second composition which is a support layer forming material for the three-dimensional shaped article 500 shaped by the formation apparatus 2000 according to the present embodiment is contained in a second composition container 1710a, and the individual second composition containers 1710a are connected by the supplying tubes 1720 to the individual second composition discharging sections 1730. As such, by providing the individual second composition containers 1710a, a plurality of different types of second compositions can be supplied from the head base 1600.

Details of specific examples of components of the first composition and the second composition used in the formation apparatus 2000 of this example will be described later.

The formation apparatus 2000 includes a control unit 400 as control means for controlling the above-described stage 120, the first composition discharging section 1230 provided in the first composition supplying device 1200, and the second composition discharging section 1730 provided in the second composition supplying device 1700, based on the data for shaping the three-dimensional shaped article 500 output from a data output device such as a personal computer (not shown). The control unit 400 also functions as a control section for controlling the stage 120 and the first composition discharging section 1230 such that they are driven and operated in a cooperative manner, and for controlling the stage 120 and the second composition discharging section 1730 such that they are driven and operated in a cooperative manner.

For the stage 120 movably provided on the base 110, a signal for controlling start and stop of movement, movement direction, movement amount, movement speed, and the like of the stage 120 is generated in a stage controller 410 based on a control signal from the control unit 400, and sent to the drive device 111 provided on the base 110, thereby causing the stage 120 to move in the X, Y, or Z direction shown in the drawing. In the first composition discharging section 1230 provided in the head unit 1400, a signal for controlling an amount of the material discharged from the discharging nozzle 1230a and the like in the discharging drive section 1230b provided in the first composition discharging section 1230 is generated in the material supplying controller 1500 based on a control signal from the control unit 400, and the generated signal causes a predetermined amount of the first composition to be discharged from the discharging nozzle 1230a.

Similarly, in the second composition discharging section 1730 provided in the head unit 1900, a signal for controlling an amount of the material discharged from the discharging nozzle 1730a and the like in the discharging drive section 1730b provided in the second composition discharging section 1730 is generated in the material supplying controller 1500 based on a control signal from the control unit 400, and the generated signal causes a predetermined amount of the second composition to be discharged from the discharging nozzle 1730a.

Next, the head unit 1400 will be described in more detail. It is noted that the head unit 1900 has the same configuration as the head unit 1400. Therefore, a detailed description for the configuration of the head unit 1900 will be omitted.

Figure 5:
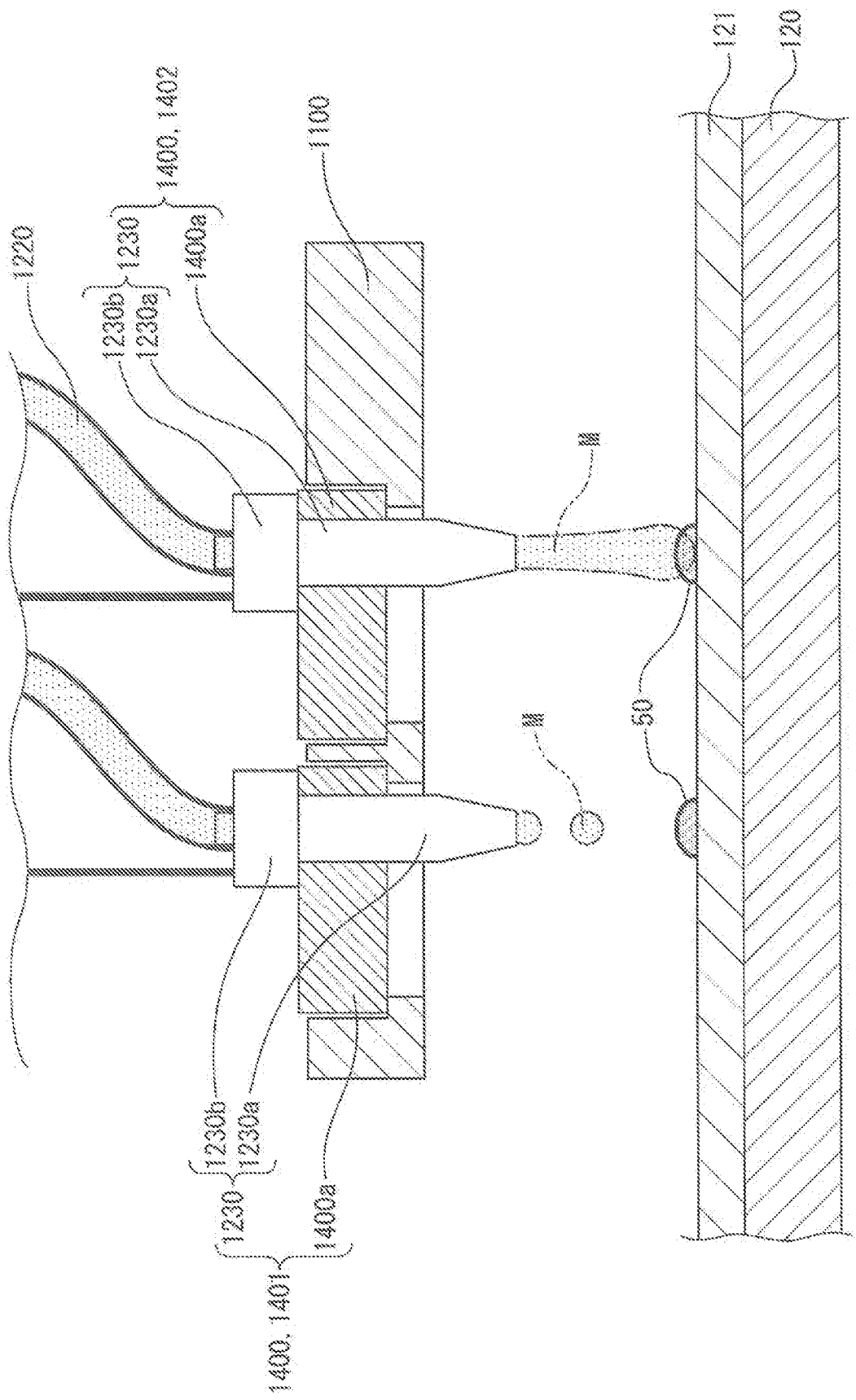
FIG. 5 is a schematic perspective view of a head base according to an embodiment of the invention.
Figure 6:
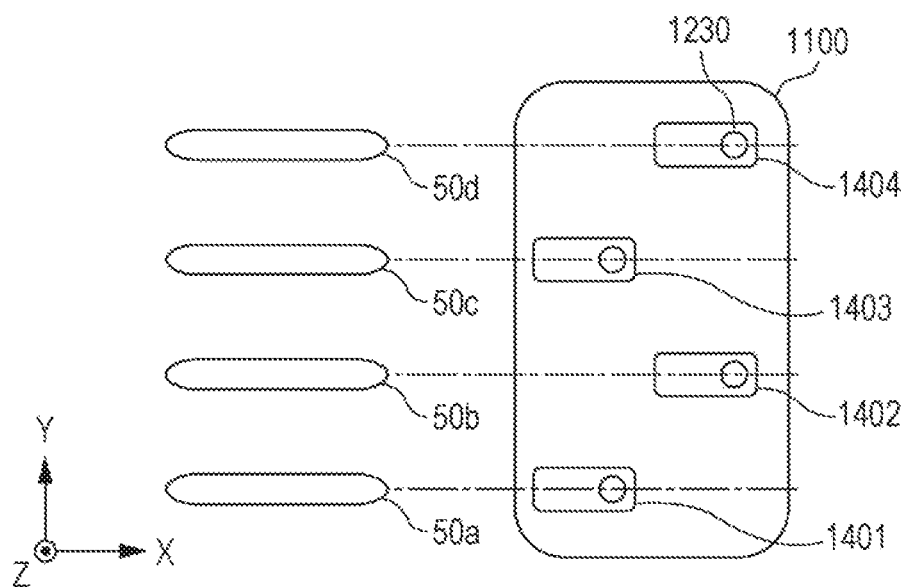
FIG. 6 is a plan view conceptually explaining a relationship between a disposition of head units and a formation form of a three-dimensional shaped article according to an embodiment of the invention.
Figure 7:
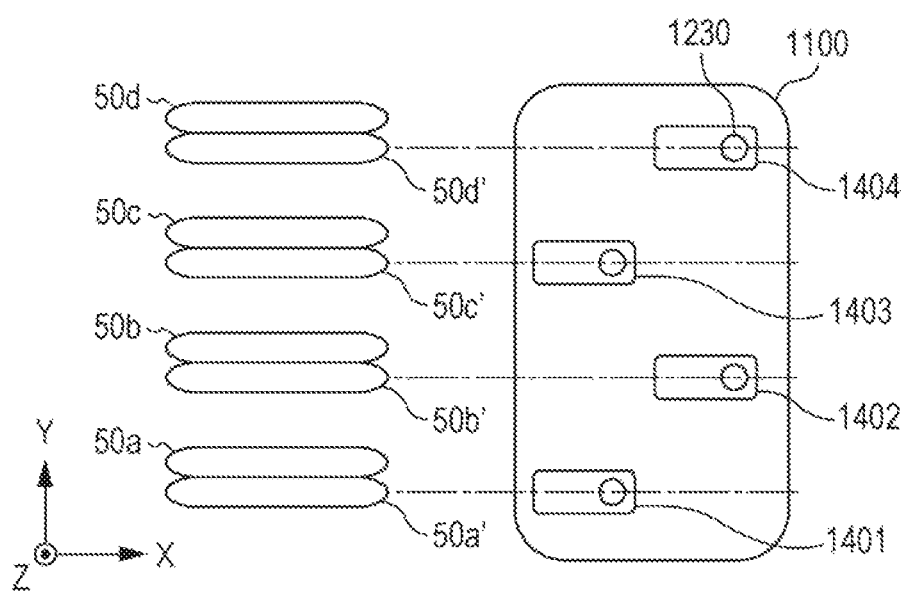
FIG. 7 is a plan view conceptually explaining the relationship between the disposition of head units and the formation form of a three-dimensional shaped article according to an embodiment of the invention.
Figure 8:
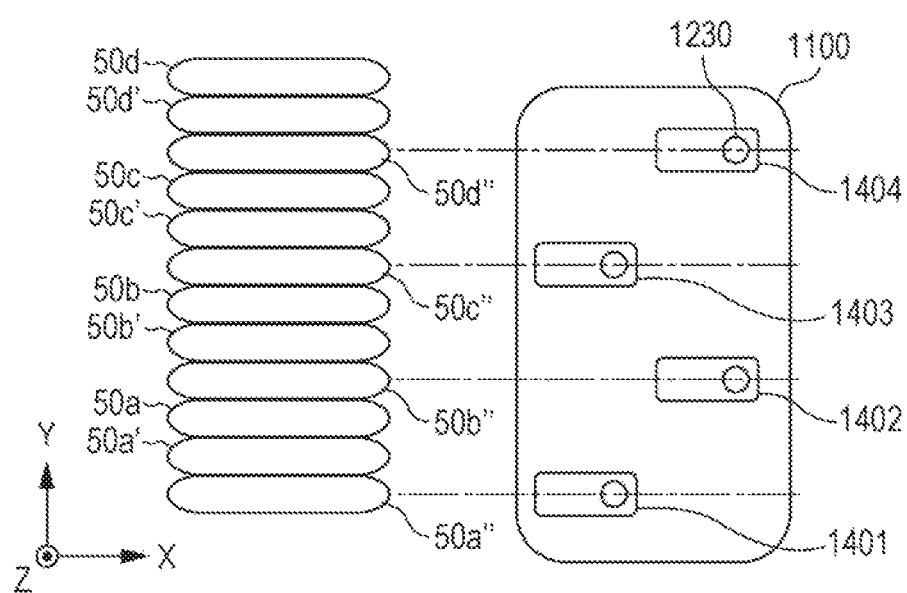
FIG. 8 is a plan view conceptually explaining the relationship between the disposition of head units and the formation form of a three-dimensional shaped article according to an embodiment of the invention.

FIG. 5 and FIGS. 6 to 8 show an example of the holding form for a plurality of the head units 1400 and the first composition discharging sections 1230 held in the head base 1100. Among them, FIGS. 6 to 8 show an external view of the head base 1100 as seen from the direction of an arrow D shown in FIG. 2.

As shown in FIG. 5, the plurality of head units 1400 are held in the head base 1100 by fixing means (not shown). As shown in FIGS. 6 to 8, the head base 1100 of the formation apparatus 2000 according to the present embodiment is provided with the head units 1400 in which, as seen from the bottom of the drawing, four units of a head unit 1401 at the first row, a head unit 1402 at the second row, a head unit 1403 at the third row, and a head unit 1404 at the fourth row are disposed in a staggered (alternating) manner. As shown in FIG. 6, the first composition is discharged from each of the head units 1400 to form constituent layer constituting portions 50 (constituent layer constituting portions 50a, 50b, 50c, and 50d) while moving the stage 120 in the X direction with respect to the head base 1100. The procedure for forming the constituent layer constituting portions 50 will be described later. In this case, a layer of the constituent layer constituting portion 50 formed by being discharged from the first composition discharging section 1230 corresponds to the first layer 310 (see FIG. 1), and a layer of the constituent layer constituting portion 50 formed by being discharged from the second composition discharging section 1730 corresponds to the second layer 300 (see FIG. 3).

Although not shown, the first composition discharging section 1230 provided in each of the head units 1401 to 1404 is configured to be connected, via the discharging drive section 1230b and by the supplying tube 1220, to the first composition supplying unit 1210.

As shown in FIG. 5, in the first composition discharging section 1230, a material M which is the first composition (pasty flowable material) is discharged from the discharging nozzle 1230a onto the sample plate 121 placed on the stage 120. In the head unit 1401, a discharging form in which the material M is discharged in a droplet shape is illustrated, and in the head unit 1402, a discharging form in which the material M is supplied in a continuous body shape is illustrated. The discharging form for the material M may be in a droplet shape or in a continuous body shape, and in the present embodiment, the description is made for a case where the material M is discharged in a droplet shape.

The material M discharged in a droplet shape from the discharging nozzle 1230a flies in almost the gravity direction and lands on the sample plate 121. The stage 120 moves and the constituent layer constituting portions 50 are formed by the landed material M. The assembly of the constituent layer constituting portions 50 is formed as first layers 310 (see FIG. 1) of the three-dimensional shaped article 500 to be formed on the sample plate 121.

Next, the procedure for forming the constituent layer constituting portions 50 will be described with reference to FIGS. 6 to 8, and FIGS. 9 and 10.

Figure 9:
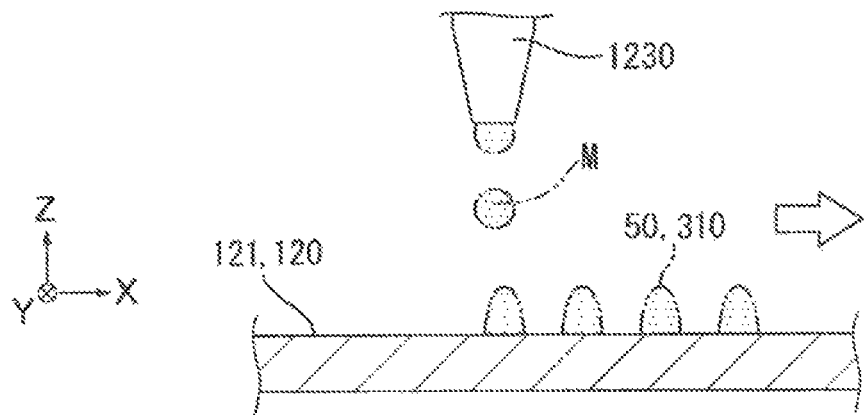
FIG. 9 is a schematic diagram conceptually explaining the formation form of a three-dimensional shaped article.
Figure 10:
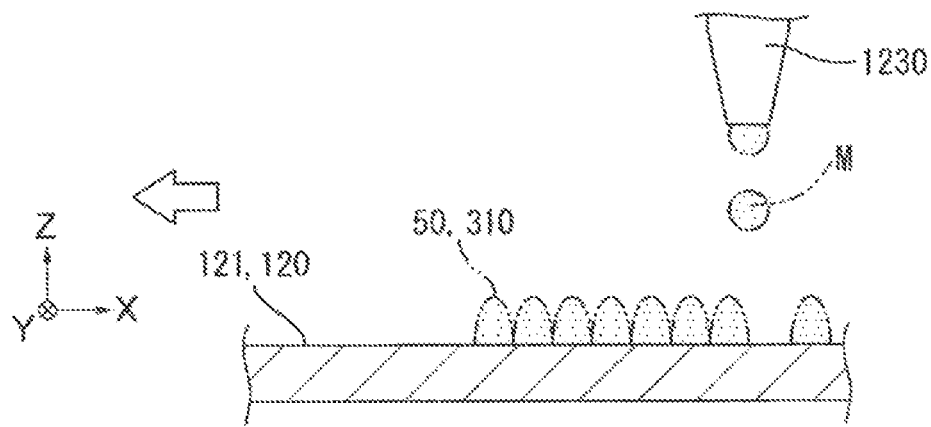
FIG. 10 is a schematic diagram conceptually explaining the formation form of a three-dimensional shaped article.

FIGS. 6 to 8 are plan views conceptually explaining the relationship between the disposition of the head units 1400 and the formation form of the constituent layer constituting portions 50 of the present embodiment. FIGS. 9 and 10 are side views conceptually showing the formation form of the constituent layer constituting portions 50.

First, in a case where the stage 120 moves in the +X direction, the material M is discharged in a droplet shape from a plurality of the discharging nozzles 1230a, and the material M is disposed at predetermined positions of the sample plate 121, thereby forming the constituent layer constituting portions 50.

More specifically, first, as shown in FIG. 9, the material M is disposed at a fixed interval at predetermined positions of the sample plate 121 from the plurality of discharging nozzles 1230a while moving the stage 120 in the +X direction.

Next, as shown in FIG. 10, the material M is newly disposed so as to fill the spaces between the materials M disposed at a fixed interval while moving the stage 120 in the −X direction.

However, a configuration where the material M is disposed so as to overlap each other (so as not to be spaced apart) at predetermined positions of the sample plate 121 from the plurality of discharging nozzles 1230a while moving the stage 120 in the +X direction (such configuration indicates not a configuration in which the constituent layer constituting portions 50 are formed by a reciprocating movement of the stage 120 in the X direction but a configuration in which the constituent layer constituting portions 50 are formed by only one directional movement of the stage 120 in the X direction) may be adopted.

By forming the constituent layer constituting portions 50 as described above, as shown in FIG. 6, the constituent layer constituting portions 50 (constituent layer constituting portions 50a, 50b, 50c, and 50d) are formed along one line in the X direction (a first line in the Y direction) of the respective head units 1401, 1402, 1403, and 1404.

Next, in order to form constituent layer constituting portions 50' (constituent layer constituting portions 50a', 50b', 50c', and 50d') along a second line in the Y direction of the respective head units 1401, 1402, 1403, and 1404, the head base 1100 is allowed to move in the −Y direction. In a case where the pitch between nozzles is set as P, the amount of movement is such that a movement is made in the −Y direction by P/n (n is a natural number) pitch. In this example, description is made assuming that n is 3.

By performing the same operation as that described above as shown in FIGS. 9 and 10, the constituent layer constituting portions 50' (constituent layer constituting portions 50a', 50b', 50c' and 50d') as shown in FIG. 7 are formed along the second line in the Y direction.

Next, in order to form constituent layer constituting portions 50" (constituent layer constituting portions 50a", 50b", 50c", and 50d") along a third line in the Y direction of the respective head units 1401, 1402, 1403, and 1404, the head base 1100 is allowed to move in the −Y direction. The amount of movement is such that a movement is made in the -Y direction by P/3 pitch.

By performing the same operation as that described above as shown in FIGS. 9 and 10, the constituent layer constituting portions 50" (constituent layer constituting portions 50a", 50b", 50c", and 50d") as shown in FIG. 8 can be formed along the third line in the Y direction, thereby obtaining the first layer 310.

Further, for the material M that is discharged from the first composition discharging section 1230, it is also possible to cause one unit, or two or more units of the head units 1401, 1402, 1403, and 1404 to discharge and supply the first composition that is different from another head unit. Thus, by using the formation apparatus 2000 according to the present embodiment, it is possible to obtain a three-dimensional shaped article formed of different materials.

In the first layer 501, before or after forming the first layer 310 as described above, it is possible to form the second layer 300, in a similar manner, by discharging the second composition from the second composition discharging section 1730. Also in a case where layers 502, 503, . . . , 50n are formed on the layer 501 such that they are stacked on top of each other, it is possible to form the first layer 310 and the second layer 300 in a similar manner.

The number and disposition of the head units 1400 and 1900 provided in the formation apparatus 2000 according to the present embodiment described above are not limited to the number and disposition described above. For example, FIGS. 11 and 12 schematically illustrate an example of another disposition for the head units 1400 disposed in the head base 1100.

Figure 11:
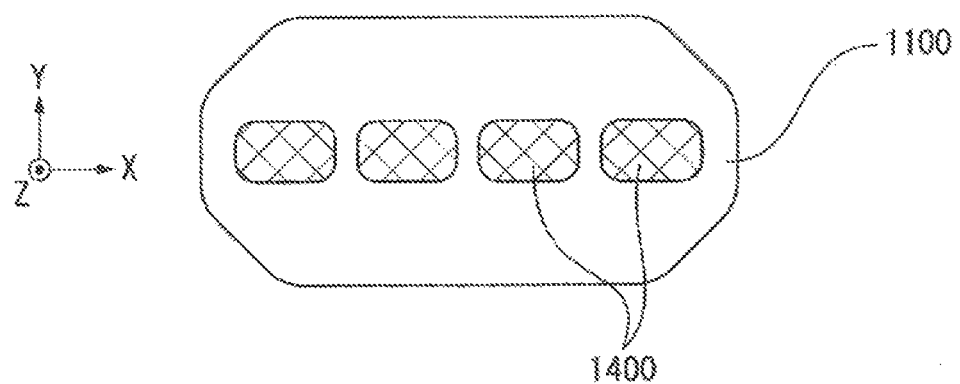
FIG. 11 is a schematic diagram showing an example of another disposition of head units disposed on a head base.
Figure 12:
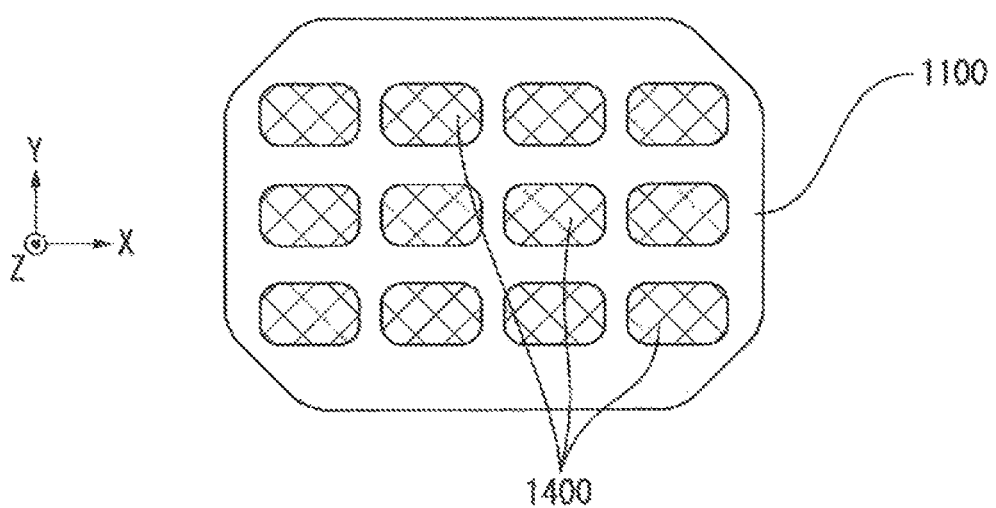
FIG. 12 is a schematic diagram showing an example of another disposition of head units disposed on a head base.

FIG. 11 shows a configuration obtained by juxtaposing a plurality of head units 1400 in the head base 1100 in the X-axis direction. FIG. 12 shows a configuration by disposing the head units 1400 in the head base 1100 in a lattice pattern. In any case, the number of the head units to be disposed is not limited to the illustrated examples.

Next, the respective three-dimensional shaping pastes as the first composition and the second composition of this example will be described in detail.

As the constituent material powder of the first composition, for example, a single powder of magnesium (Mg), iron (Fe), cobalt (Co) or chromium (Cr), aluminum (Al), titanium (Ti), copper (Cu), or nickel (Ni), or a mixed powder of an alloy containing at least one of these metals (maraging steel, stainless steel, cobalt chrome molybdenum, titanium alloy, nickel alloy, aluminum alloy, cobalt alloy, or cobalt chromium alloy), or the like can be used. Further, a powder of a metal other than the above metals, oxide ceramics such as silicon dioxide, titanium dioxide, aluminum oxide, and zirconium oxide, non-oxide ceramics such as aluminum nitride, and the like can also be used.

As the first powder of the first composition and the second powder of the second composition, for example, it is possible to use a general-purpose engineering plastic such as polyamide, polyacetal, polycarbonate, modified polyphenylene ether, polybutylene terephthalate, or polyethylene terephthalate. In addition, it is possible to use a powder of a resin including an engineering plastic such as polysulfone, polyether sulfone, polyphenylene sulfide, polyarylate, polyimide, polyamideimide, polyetherimide, or polyether ether ketone, and the like.

In addition, as the second powder of the second composition, a carbon particle can be used.

As the solvent, for example, water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkyl ammonium acetates; sulfoxide-based solvents such as dimethyl sulfoxide and diethyl sulfoxide; pyridine-based solvents such as pyridine, γ-picoline, and 2,6-lutidine; tetraalkyl ammonium acetate (for example, tetrabutylammonium acetate); ionic liquids such as butyl carbitol acetate; or the like can be used, and one selected from these or a combination of two or more thereof can be used.

As the binder, for example, an acrylic resin, an epoxy resin, a silicone resin, a cellulose-based resin, or other synthetic resin, or a polylactic acid (PLA), a polyamide (PA), a polyphenylene sulfide (PPS), polyether ether ketone (PEEK) or other thermoplastic resin can be used.

Further, as described above, in a case where a compound is used as the first composition and the second composition, a powder of a metal such as the above metals, the oxide ceramics, the non-oxide ceramics, and the like can be used as the constituent material powder of the first composition, and a powder of a resin can be used as the first powder of the first composition and the second powder of the second composition (a carbon particle can also be used as the second powder). In addition to such a powder, polystyrene, polypropylene, acrylic, or the like as a binder; phthalic acid ester or the like as a thermoplastic agent; wax; and the like can be preferably used.

Next, an example of the production method for the three-dimensional shaped article carried out by using the formation apparatus 2000 will be described with reference to a flowchart.

Figure 13:
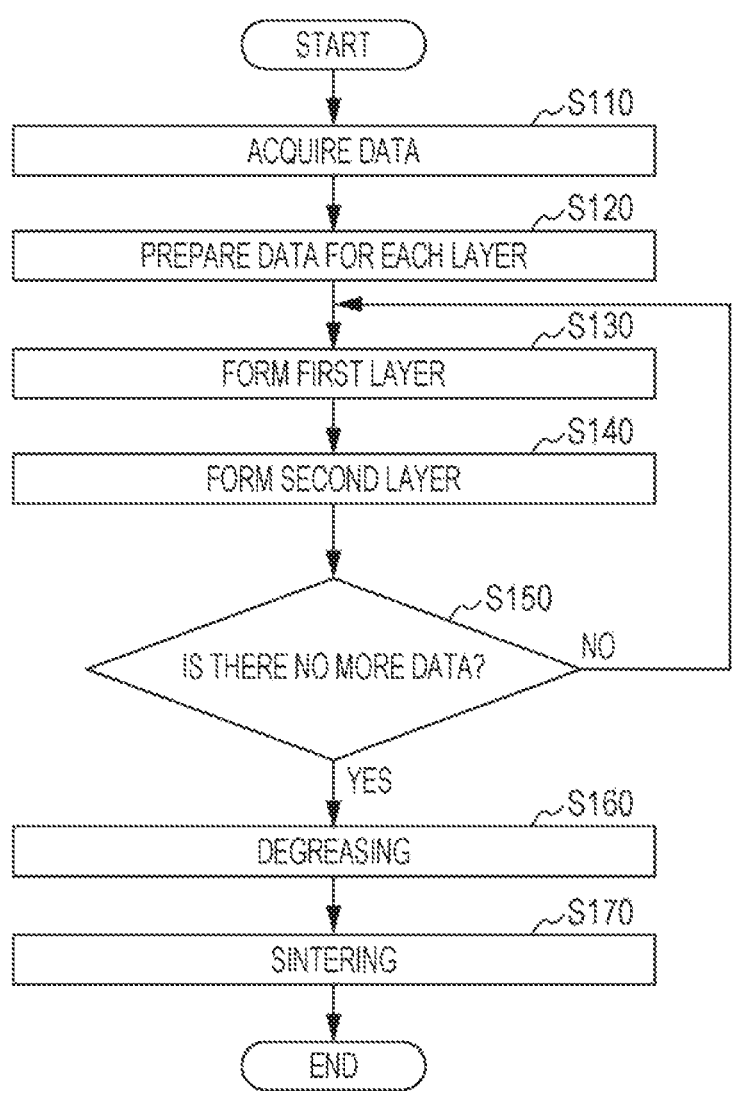
FIG. 13 is a flowchart of a method for producing a three-dimensional shaped article according to an example of the invention.
Figure 14:
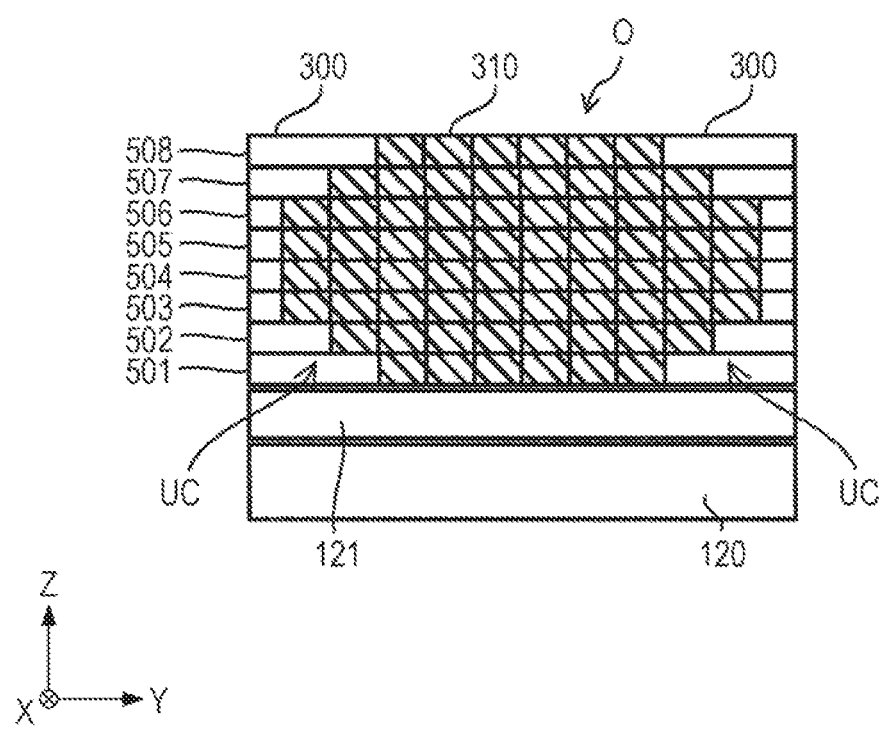
FIG. 14 is a schematic diagram showing one example of a three-dimensional shaped article formed using a production apparatus for a three-dimensional shaped article according to an embodiment of the invention.

In this case, FIG. 13 is a flowchart for the production method for the three-dimensional shaped article according to this example. Further, FIG. 14 is a schematic diagram showing one example of the three-dimensional shaped article 500 formed by the formation apparatus 2000 (method for producing the present three-dimensional shaped article).

In the method for producing a three-dimensional shaped article of this example, the first compositions and the second compositions of the following Examples 1 to 3 were used.

EXAMPLE 1

As the first composition, a paste that contains 22.5% by mass of a Cu powder (constituent material powder of the three-dimensional shaped article 500) having an average particle diameter (d50) of 1.5 μm, 22.5% by mass of polyamide 12 (PA 12) which is the first powder, and has a decomposition point of 400° C. to 450° C. and an average particle size (d50) of 2.5 μm, and 55% by mass of an acrylic resin binder solution (obtained by dissolving 26% by mass of an acrylic resin having a decomposition point of 300° C. to 400° C. with respect to butyl carbitol acetate) was used.

As the second composition, a paste that contains 45% by mass of PA 12 which is the second powder and has an average particle diameter (d50) of 5 μm, and 55% by mass of an acrylic resin binder solution (obtained by dissolving 26% by mass of an acrylic resin having a decomposition point of 300° C. to 400° C. with respect to butyl carbitol acetate) was used.

EXAMPLE 2

As the first composition, the same first composition as in Example 1 was used.

As the second composition, a paste that contains 45% by mass of polyphenylene sulfide (PPS) which is the second powder, and has a decomposition point of 490° C. to 760° C. and an average particle diameter (d50) of 5 μm, and 55% by mass of an acrylic resin binder solution (obtained by dissolving 26% by mass of an acrylic resin having a decomposition point of 300° C. to 400° C. with respect to butyl carbitol acetate) was used.

EXAMPLE 3

As the first composition, the same first composition as in Example 1 was used.

As the second composition, a paste that contains 45% by mass of a carbon particle which is the second powder and has an average particle diameter (d 50) of 5 μm, and 55% by mass of an acrylic resin binder solution (obtained by dissolving 26% by mass of an acrylic resin having a decomposition point of 300° C. to 400° C. with respect to butyl carbitol acetate) was used.

As shown in FIG. 13, in the production method for a three-dimensional shaped article of this example, firstly, in step S110, data for the three-dimensional shaped article 500 is acquired. Specifically, for example, data representing the shape of the three-dimensional shaped article 500 is acquired from an application program or the like run on a personal computer.

Next, in step S120, under control of the control unit 400, data for each layer is prepared (generated). Specifically, in the data representing the shape of the three-dimensional shaped article 500, slicing is performed according to the shaping resolution in the Z direction, and bitmap data (sectional data) is generated for each section.

Next, in the first layer formation step of step S130, under control of the control unit 400, based on cross-sectional data generated in step S120, the first composition is discharged from the first composition discharging section 1230, to form the constituent layer constituting portion 50 (first layer 310) based on the cross-sectional data.

Next, in the second layer formation step of step S140, under control of the control unit 400, based on cross-sectional data generated in step S120, the second composition is discharged from the second composition discharging section 1730, to form the constituent layer constituting portion 50 (second layer 300) based on the cross-sectional data. At this time, in order that the second layer 300 supports the first layer 310, the second layer 300 is formed to be in contact with at least one of upper, lower, left, and right positions with respect to the first layer 310.

It is noted that an order of the first layer formation step in step S130 and the second layer formation step in step S140 may be reversed.

Steps S130 to S150 are repeated by control of the control unit 400 until a determination is made in step S150 whether shaping of the stack of the three-dimensional shaped article 500 based on the bitmap data corresponding to each of the layers generated in step S120 is completed.

FIG. 14 shows one example of the three-dimensional shaped article 500 formed by repeating steps S130 to S150 eight times (eight layers from layer 501 to layer 508).

Then, in a degreasing step of step S160, for example, in a constant temperature (not shown), the stack of the three-dimensional shaped article 500 formed in the above step is heated to remove at least a part of the first powder, the binder, and the solvent in the first composition, the second powder, the binder, and the solvent in the second composition, and the like.

Then, in a sintering step of step S170, for example, in a constant temperature bath (not shown), the stack of the three-dimensional shaped article 500 formed in the above step is heated to perform sintering of the constituent material powder in the first composition.

Then, along with completion of step S170, the production method for the three-dimensional shaped article of this example is completed.

As described above, the method for producing a three-dimensional shaped article according to this example is a method for producing a three-dimensional shaped article in which the three-dimensional shaped article 500 is produced by stacking layers (layers 501, 502, 503, . . . , 50*n*), the method including the first layer formation step (step S130) of forming the first layer 310 out of layers 501, 502, 503, . . . , 50*n* by using the first composition that contains a constituent material powder, a first powder, and a binder which constitute the three-dimensional shaped article 500, the second layer formation step (step S140) of forming the second layer 300 out of layers 501, 502, 503, . . . , 50*n* by using the second composition that contains a second powder and a binder so that the second layer 300 is in contact with the first layer 310, the degreasing step (step S160) of heating a stack containing the first layer 310 and the second layer 300 to remove at least a part of the first powder, the binder of the first layer 310, and the binder of the second layer 300, and the sintering step (step S170) of heating the stack containing the first layer 310 and the second layer 300 to sinter the constituent material powder.

In a case where the first compositions and the second compositions in Examples 1 and 2 are used, the first powder and the second powder are the same material (Example 1: both the first powder and the second powder are PA 12) or both are resin materials (Example 2: the first powder is PA 12, and the second powder is PPS); a decomposition point of the first powder (PA 12) is higher than decomposition points of the binder (acrylic resin) of the first layer 310 and the binder (acrylic resin) of the second layer 300; a decomposition point of the second powder (Example 1: PA 12, Example 2: PPS) is equal to or higher than the decomposition point of the first powder (Example 1: the same, Example 2: higher than the first powder); and a sintering temperature of the constituent material powder (Cu powder) is higher than the decomposition point of the second powder.

In a case of using the first composition and the second composition as such, by sintering the constituent material powder, it is possible to decompose and remove (sublimate or the like) the second powder which can become an impurity derived from the support layer together with the first powder, and to prevent an impurity derived from the support layer from being incorporated into the three-dimensional shaped article.

In addition, in a case of using the first composition and the second composition in Example 3, the first powder is a resin material (PA 12); the second powder is a carbon particle; a decomposition point of the first powder is higher than decomposition points of the binder of the first layer 310 and the binder of the second layer 300; and a sintering temperature of the constituent material powder (Cu powder) is higher than the decomposition point of the second powder.

In a case of using the first composition and the second composition as such, by subjecting the carbon particle to oxidation under an oxidizing atmosphere, to heating under a reducing atmosphere in which hydrogen gas or the like is introduced, or the like in a degreasing step or sintering step, it is possible to gasify and remove the carbon particle by sintering the constituent material powder, and to prevent an impurity derived from the support layer from being incorporated into the three-dimensional shaped article.

In this case, the stack (stack containing the first layer 310 and the second layer 300) of the three-dimensional shaped article 500 shown in FIG. 14 produced by the production method for a three-dimensional shaped article of this example has a region where the first layer 310 overlaps with the second layer 300. That is, the stack has an undercut region UC where the first layer 310 is supported, from a lower side, by the second layer 300.

In such an undercut region UC, the second powder easily enters a pore derived from the first powder. However, even in a case where the second powder enters the pore, by removing (sublimating or the like) the second powder, it is possible to prevent an impurity derived from the support layer from being incorporated into the three-dimensional shaped article 500.

In the first compositions of Examples 1 to 3, the constituent material powder of the three-dimensional shaped article is a Cu powder which is a metal. Therefore, in the method for producing a three-dimensional shaped article, the sintering step in step S170 is performed under a reducing atmosphere. As such, in a case where the constituent material powder of the three-dimensional shaped article is a metal or non-oxide ceramics, it is preferable that the sintering step be performed under a reducing atmosphere. This is because it is possible to prevent an impurity derived from the support layer from being incorporated into the three-dimensional shaped article 500 without oxidizing the constituent material powder which is a metal or non-oxide ceramics.

However, in a case where the constituent material powder of the three-dimensional shaped article is oxide ceramics, it is preferable that the sintering step be performed under an oxidizing atmosphere. By performing the sintering step under an oxidizing atmosphere, it is possible to prevent an impurity derived from the support layer from being incorporated into the three-dimensional shaped article 500 without reducing the constituent material powder which is oxide ceramics.

In addition, in the production method for a three-dimensional shaped article of this example, the first composition and the second composition are pastes containing a solvent, in which, in the first layer formation step, the first layer 310 is formed by ejecting the first composition, and in the second layer formation step, the second layer 300 is formed by ejecting the second composition. Therefore, by using the pastes, it is possible to produce a three-dimensional shaped article in which an impurity derived from the support layer is prevented from being incorporated.

However, the invention is not limited to such a method for producing a three-dimensional shaped article.

A method in which the first composition and the second composition are solids at room temperature so that in the first layer formation step, the first layer 310 is formed by heating the first composition to a fluid state and performing injection, and in the second layer formation step, the second layer 300 is formed by heating the second composition to a fluid state and performing injection may be adopted. With such a method, by using a material (compound) which is a solid at room temperature, it is possible to produce a three-dimensional shaped article in which an impurity derived from the support layer is prevented from being incorporated.

The invention is not limited to the examples described above, and can be realized in various configurations without departing from the scope and spirit thereof. For example, the technical features in the examples corresponding to the technical features in the respective embodiments described in the "SUMMARY" section can be appropriately replaced or combined in order to achieve the advantages above described. Further, such a technical feature may be appropriately omitted unless it is described as an essential feature in the specification.

What is claimed is:

1. A method for producing a three-dimensional shaped article in which the three-dimensional shaped article is produced by stacking layers, the method comprising:

forming a first layer out of the layers by using a first composition that contains a constituent material powder, a first powder, and a binder which constitute the three-dimensional shaped article;

forming a second layer out of the layers by using a second composition that is different from the first composition and contains a second powder and a binder so that the second layer is in contact with the first layer;

removing at least a part of the first powder, the binder of the first layer, and the binder of the second layer by heating a stack containing the first layer and the second layer; and sintering the constituent material powder by heating the stack containing the first layer and the second layer, wherein the first powder and the second powder are both resin materials, a decomposition point of the first powder is higher than decomposition points of the binder of the first layer and the binder of the second layer, a decomposition point of the second powder is higher than the decomposition point of the first powder, a sintering temperature of the constituent material powder is higher than the decomposition point of the second powder, the first composition and the second composition are solids at room temperature, in the forming of the first layer, the first layer is formed by heating the first composition that includes each of the constituent material powder, the first powder, and the binder to a fluid state and performing injection, and in the forming of the second layer, the second layer is formed by heating the second composition that includes each of the second powder and the binder to a fluid state and performing injection.

2. A method for producing a three-dimensional shaped article in which the three-dimensional shaped article is produced by stacking layers, the method comprising:

forming a first layer out of the layers by using a first composition that contains a constituent material powder, a first powder, and a binder which constitute the three-dimensional shaped article;

forming a second layer out of the layers by using a second composition that is different from the composition and contains a second powder and a binder so that the second layer is in contact with the first layer;

removing at least a part of the first powder, the binder of the first layer, and the binder of the second layer by heating a stack containing the first layer and the second layer; and sintering the constituent material powder by heating the stack containing the first layer and the second layer, wherein the first powder is a resin material and the second powder includes particles that include carbon, a decomposition point of the first powder is higher than decomposition points of the binder of the first layer and the binder of the second layer, a sintering temperature of the constituent material powder is higher than the decomposition point of the second powder, the first composition and the second composition are solids at room temperature, in the forming of the first layer, the first layer is formed by heating the first composition that includes each of the constituent material powder, the first powder, and the binder to a fluid state and performing injection, and in the forming of the second layer, the second layer is formed by heating the second composition that includes each of the second powder and the binder to a fluid state and performing injection.

3. The method for producing a three-dimensional shaped article according to claim 1, wherein the stack containing the first layer and the second layer has a region where the first layer overlaps with the second layer.

4. The method of producing a three-dimensional shaped article according to claim 1, wherein the constituent material powder is a metal or non-oxide ceramics, and the sintering is performed under a reducing atmosphere.

5. The method for producing a three-dimensional shaped article according to claim 1, wherein the constituent material powder is oxide ceramics, and the sintering is performed under an oxidizing atmosphere.

6. The method for producing a three-dimensional shaped article according to claim 1, wherein the first composition and the second composition are pastes containing a solvent, in the forming of the first layer, the first layer is formed by ejecting the first composition, and in the forming of the second layer, the second layer is formed by ejecting the second composition.

* * * * *